(12) United States Patent
Minagawa

(10) Patent No.: US 8,258,224 B2
(45) Date of Patent: Sep. 4, 2012

(54) RUBBER COMPOSITION FOR TIRE, AND TIRE

(75) Inventor: Yasuhisa Minagawa, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 12/153,770

(22) Filed: May 23, 2008

(65) Prior Publication Data

US 2008/0306199 A1    Dec. 11, 2008

(30) Foreign Application Priority Data

Jun. 8, 2007 (JP) ................................. 2007-153082

(51) Int. Cl.
*C08K 5/00* (2006.01)
*C08K 5/04* (2006.01)
*C08K 5/09* (2006.01)
*D06M 15/693* (2006.01)

(52) U.S. Cl. ....................................... 524/399; 524/394

(58) Field of Classification Search ................. 524/394, 524/399

See application file for complete search history.

(56) References Cited

U.S. PATENT DOCUMENTS

| | | | | |
|---|---|---|---|---|
| 3,738,948 A * | 6/1973 | Dunnom | ....................... | 523/514 |
| 5,504,140 A * | 4/1996 | Zanzig et al. | ................. | 524/526 |
| 6,313,183 B1 * | 11/2001 | Pillai et al. | ....................... | 521/41 |
| 6,359,071 B1 * | 3/2002 | Watanabe et al. | ............. | 525/184 |
| 6,433,064 B1 * | 8/2002 | Gorl et al. | ..................... | 524/492 |
| 6,538,066 B2 * | 3/2003 | Watanabe et al. | ............. | 525/184 |
| 6,720,369 B2 * | 4/2004 | Goerl et al. | ................... | 523/215 |
| 6,736,176 B2 * | 5/2004 | Teratani | ........................ | 152/516 |
| 6,822,036 B1 * | 11/2004 | Gorl et al. | ..................... | 524/492 |
| 6,861,470 B2 * | 3/2005 | Watanabe et al. | ............... | 525/55 |
| 7,152,642 B2 * | 12/2006 | Serra et al. | .................. | 152/209.5 |
| 7,275,574 B2 * | 10/2007 | Watanabe et al. | ............. | 152/450 |
| 2001/0009932 A1 * | 7/2001 | Garro et al. | .................... | 523/152 |
| 2001/0018492 A1 * | 8/2001 | Watanabe et al. | ............. | 525/178 |
| 2001/0042580 A1 * | 11/2001 | Teratani | ........................ | 152/450 |
| 2002/0019473 A1 * | 2/2002 | Kayser et al. | .................. | 524/442 |
| 2002/0091190 A1 * | 7/2002 | Goerl et al. | ................... | 524/492 |
| 2003/0181592 A1 * | 9/2003 | Watanabe et al. | ............. | 525/184 |
| 2004/0045650 A1 | 3/2004 | Serra et al. | | |
| 2004/0140042 A1 * | 7/2004 | Teratani et al. | ............ | 156/110.1 |
| 2004/0229999 A1 * | 11/2004 | Achten et al. | ................... | 525/55 |
| 2005/0103417 A1 | 5/2005 | Watanabe et al. | | |
| 2005/0209390 A1 * | 9/2005 | Yagi et al. | ..................... | 524/493 |
| 2006/0151084 A1 * | 7/2006 | Serra | ............................ | 152/541 |

FOREIGN PATENT DOCUMENTS

| | | |
|---|---|---|
| CN | 1670062 A | 9/2005 |
| DE | 3603550 A1 | 10/1986 |
| EP | 1 577 341 A1 | 9/2005 |
| JP | 61-226302 A | 10/1986 |
| JP | 2-169642 A | 6/1990 |
| JP | 7-53782 A | 2/1995 |
| JP | 7-286070 A | 10/1995 |
| JP | 11-181149 A | 7/1999 |
| JP | 2001-233997 A | 8/2001 |
| JP | 2004-525022 A | 8/2004 |
| JP | 2005-272508 A | 10/2005 |
| WO | WO-02/078983 A1 | 10/2002 |

* cited by examiner

*Primary Examiner* — Peter F Godenschwager
*Assistant Examiner* — Angela C Scott
(74) *Attorney, Agent, or Firm* — Birch, Stewart, Kolasch & Birch, LLP

(57) ABSTRACT

The present invention provides a rubber composition for a tire containing an epoxidized natural rubber, sulfur and a fatty acid metal salt, in which the metal of the fatty acid metal salt is a metal belonging to Group 12, 13 or 14 of the periodic table. Here, the fatty acid metal salt is preferably at least one kind selected from the group consisting of zinc stearate, aluminum stearate and tin stearate. Also, the present invention provides a tire manufactured by using the foregoing rubber composition for a tire.

4 Claims, 1 Drawing Sheet

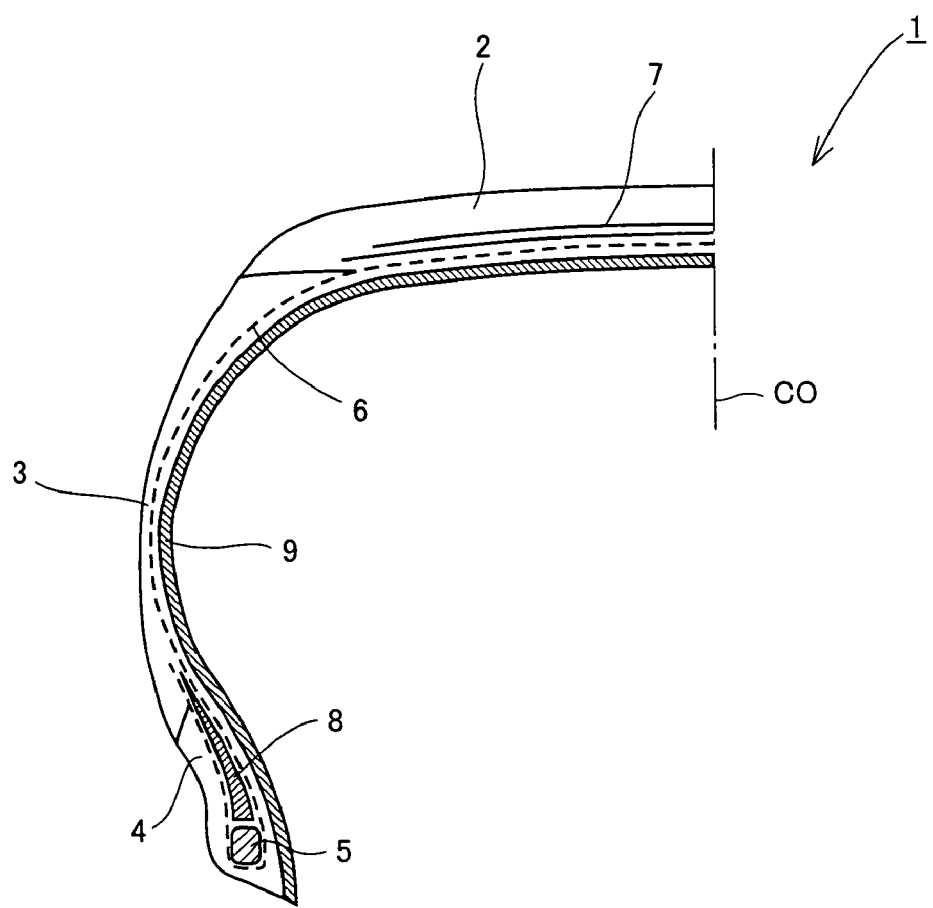

RUBBER COMPOSITION FOR TIRE, AND TIRE

This nonprovisional application is based on Japanese Patent Application No. 2007-153082 filed with the Japan Patent Office on Jun. 8, 2007, the entire contents of which are hereby incorporated by reference.

BACKGROUND OF THE INVENTION

1. Field of the Invention

The present invention relates to a rubber composition for a tire and a tire, and particularly to a rubber composition for a tire whereby reversion can be restrained and high in rubber strength after vulcanization and thermal aging resistance, and a tire manufactured by using the rubber composition for a tire.

2. Description of the Background Art

In recent years, much effort has been made to improve fuel efficiency of vehicles and wear resistance of tires.

In addition, environment issues are becoming more important and the regulation for restraining carbon dioxide emission has been intensified to restrain global warming. Also, the problem is that petroleum resources are limited and will be exhausted, so that more materials derived from resources other than petroleum have been used.

In particular, with regard to a rubber composition for a tire used for forming treads of tires, in order to secure sufficient grip performance of tires, it is not sufficient to use a natural rubber for a rubber component thereof and a modified natural rubber has been used. Particularly, an epoxidized natural rubber has been attracting attention.

For example, a high-strength rubber composition employing an epoxidized natural rubber is disclosed in Japanese Patent Laying-Open No. 07-053782.

SUMMARY OF THE INVENTION

However, in the case of manufacturing tires by using an epoxidized natural rubber, the epoxidized natural rubber is so great in thermal degradation that a problem of reversion is caused and properties to be normally obtained can not be obtained sufficiently.

Also, in the case of manufacturing tires by using an epoxidized natural rubber, the epoxidized natural rubber is so poor in thermal aging resistance that a problem is caused that the performance of tires is deteriorated during use.

In view of the foregoing circumstances, an object of the present invention is to provide a rubber composition for a tire whereby reversion can be restrained and high in rubber strength after vulcanization and thermal aging resistance, and a tire manufactured by using the rubber composition for a tire.

The present invention provides a rubber composition for a tire containing an epoxidized natural rubber, sulfur and a fatty acid metal salt, wherein the metal of the fatty acid metal salt is a metal belonging to Group 12, 13 or 14 of the periodic table.

Here, in the rubber composition for a tire of the present invention, the fatty acid metal salt is preferably at least one kind selected from the group consisting of zinc stearate, aluminum stearate and tin stearate.

In addition, the present invention provides a tire manufactured by using the foregoing rubber composition for a tire.

The present invention can provide a rubber composition for a tire whereby reversion can be restrained and high in rubber strength after vulcanization and thermal aging resistance, and a tire manufactured by using the rubber composition for a tire.

The foregoing and other objects, features, aspects and advantages of the present invention will become more apparent from the following detailed description of the present invention when taken in conjunction with the accompanying drawing.

BRIEF DESCRIPTION OF THE DRAWING

FIG. 1 is a schematic cross-sectional view of the upper left half of one example of a tire of the present invention.

DESCRIPTION OF THE PREFERRED EMBODIMENT

Hereinafter, an embodiment of the present invention will be described. With regard to the drawing of the present invention, the same reference number denotes the same portion or the corresponding portion.

The present inventors have completed the present invention by finding out that in the case of manufacturing a tire by using a rubber composition containing an epoxidized natural rubber, mixing of sulfur and a fatty acid metal salt containing a metal belonging to Group 12, 13 or 14 of the periodic table (long-period type periodic table) into the rubber composition can restrain the problem of reversion in manufacturing a tire by using an epoxidized natural rubber, improve thermal aging resistance and increase rubber strength after vulcanization.

<Epoxidized Natural Rubber>

A conventionally known epoxidized natural rubber can be used as the epoxidized natural rubber (ENR) used in the present invention; for example, a commercially available epoxidized natural rubber may be used, or an epoxidized natural rubber obtained by epoxidizing a natural rubber (NR) may be used. In the case of manufacturing a tire by using such an epoxidized natural rubber, the use amount of materials derived from petroleum resources can be decreased and sufficient grip performance of a tire can be obtained.

Here, a method of epoxidizing a natural rubber is not particularly limited; for example, epoxidation can be performed by using a method such as a chlorohydrin method, a direct oxidation method, a hydrogen peroxide method, an alkyl hydroperoxide method or a peroxy acid method. Examples of the peroxy acid method include a method of reacting a natural rubber with an organic peroxy acid such as peracetic acid or performic acid.

The epoxidation rate of the epoxidized natural rubber used in the present invention is preferably 10 mol % or more, more preferably 15 mol % or more. In the case where the epoxidation rate of the epoxidized natural rubber is 10 mol % or more, particularly 15 mol % or more, formation of a tread with the use of the rubber composition for a tire of the present invention tends to give a tire having sufficient grip performance.

Also, the epoxidation rate of the epoxidized natural rubber used in the present invention is preferably 60 mol % or less, more preferably 50 mol % or less. In the case where the epoxidation rate of the epoxidized natural rubber is 60 mol % or less, particularly 50 mol % or less, formation of a tread with the use of the rubber composition for a tire of the present invention tends to give a tire having sufficient grip performance for the reason that the glass transition temperature of the rubber composition for a tire of the present invention is not raised too much and rubber hardness after vulcanization at room temperature is not increased too much.

The epoxidation rate signifies the ratio (mol %) of the number of epoxidized double bonds in a rubber to the total number of double bonds in the rubber before being epoxidized.

In the present invention, one or more kinds of rubber components except the epoxidized natural rubber may be contained together therewith, such as a natural rubber (NR), a styrene-butadiene rubber (SBR), a butadiene rubber (BR), an isoprene rubber (IR), an ethylene-propylene diene rubber (EPDM), a chloroprene rubber (CR), an acrylonitrile-butadiene rubber (NBR), a butyl rubber (IIR) and a halogenated butyl rubber (X-IIR); however, it is preferable that rubber components except the epoxidized natural rubber and natural rubber are not contained from the viewpoint of decreasing the use amount of materials derived from petroleum resources and obtaining sufficient grip performance of a tire.

<Sulfur>

Sulfur that is generally used during vulcanization in the rubber industry can be used as the sulfur used in the present invention.

Here, the content of sulfur is preferably 0.3 part by mass or more, more preferably 0.5 part by mass or more, with respect to 100 parts by mass of rubber components. The case where the content of sulfur is 0.3 part by mass or more, particularly 0.5 part by mass or more, with respect to 100 parts by mass of rubber components tends to give sufficient rubber strength after vulcanization for the reason that vulcanization can sufficiently be performed for the rubber composition for a tire of the present invention.

Also, the content of sulfur is preferably 8 parts by mass or less, more preferably 5 parts by mass or less, with respect to 100 parts by mass of rubber components. In the case where the content of sulfur is 8 parts by mass or less, particularly 5 parts by mass or less, with respect to 100 parts by mass of rubber components, formation of a tread with the use of the rubber composition for a tire of the present invention tends to give a tire having sufficient grip performance for the reason that the rubber after vulcanization in the rubber composition for a tire of the present invention is not hardened too much.

<Fatty Acid Metal Salt>

A fatty acid metal salt in which the metal thereof belongs to Group 12, 13 or 14 of the periodic table (long-period type periodic table) is used as the fatty acid metal salt used in the present invention.

Here, for example, zinc stearate can be used as the fatty acid metal salt in which the metal thereof belongs to Group 12 of the periodic table.

Also, for example, aluminum stearate can be used as the fatty acid metal salt in which the metal thereof belongs to Group 13 of the periodic table.

Also, for example, tin stearate can be used as the fatty acid metal salt in which the metal thereof belongs to Group 14 of the periodic table.

Here, the fatty acid metal salt preferably contains at least one kind selected from the group consisting of zinc stearate, aluminum stearate and tin stearate. In such a case, reversion of the rubber composition for a tire of the present invention can be restrained and a tendency of further improving rubber strength after vulcanization and thermal aging resistance can be obtained.

The content of the fatty acid metal salt (the content thereof in the case of using one kind of fatty acid metal salt and the total content thereof in the case of using two kinds or more of fatty acid metal salts) is preferably 1 part by mass or more, more preferably 2 parts by mass or more, with respect to 100 parts by mass of rubber components. The case where the content of the fatty acid metal salt is 1 part by mass or more, particularly 2 parts by mass or more, with respect to 100 parts by mass of rubber components tends to give a sufficient torque maintenance factor, high rubber strength after vulcanization, high rubber strength after thermal aging in the vulcanized rubber, and low tan δ.

Also, the content of the fatty acid metal salt (the content thereof in the case of using one kind of fatty acid metal salt and the total content thereof in the case of using two kinds or more of fatty acid metal salts) is preferably 10 parts by mass or less, more preferably 8 parts by mass or less, with respect to 100 parts by mass of rubber components. The case where the content of the fatty acid metal salt is more than 8 parts by mass, particularly more than 10 parts by mass, with respect to 100 parts by mass of rubber components tends to give no effect of improving rubber properties even if the fatty acid metal salt is blended more and increase tan δ to the contrary.

<Other Components>

Various kinds of components in addition to the foregoing components may properly be blended in the rubber composition for a tire of the present invention, such as silica, a silane coupling agent, carbon black, an age resistor, stearic acid, zinc oxide, oil or a vulcanization accelerator that are generally used in the tire industry.

<Silica>

In the case where the rubber composition for a tire of the present invention contains silica, silica ordinarily used in the rubber industry can be used without particular limitation; for example, silica produced by a wet method or silica produced by a dry method can be used.

In the case where the rubber composition for a tire of the present invention contains silica, the content of silica is preferably 20 parts by mass or more, more preferably 30 parts by mass or more, with respect to 100 parts by mass of rubber components. The case where the content of silica is 20 parts by mass or more, particularly 30 parts by mass or more, with respect to 100 parts by mass of rubber components tends to give sufficient strength of the rubber after vulcanization in the rubber composition for a tire of the present invention, and to decrease the use amount of components derived from petroleum resources.

In the case where the rubber composition for a tire of the present invention contains silica, the content of silica is preferably 120 parts by mass or less, more preferably 100 parts by mass or less, with respect to 100 parts by mass of rubber components. In the case where the content of silica is 120 parts by mass or less, particularly 100 parts by mass or less, with respect to 100 parts by mass of rubber components, formation of a tread with the use of the rubber composition for a tire of the present invention tends to give a tire having sufficient grip performance for the reason that the rubber after vulcanization in the rubber composition for a tire of the present invention is not hardened too much.

In the case where the rubber composition for a tire of the present invention contains silica, the nitrogen adsorption specific surface area of contained silica by the BET method (hereinafter referred to as the "BET specific surface area") is preferably 30 m$^2$/g or more, more preferably 40 m$^2$/g or more. The case where the BET specific surface area of contained silica is 30 m$^2$/g or more, particularly 40 m$^2$/g or more, tends to give sufficient strength and wear resistance of the rubber after vulcanization in the rubber composition for a tire of the present invention.

In the case where the rubber composition for a tire of the present invention contains silica, the BET specific surface area of contained silica is preferably 450 m$^2$/g or less, more preferably 350 m$^2$/g or less. The case where the BET specific surface area of contained silica is 450 m$^2$/g or less, particularly 350 m$^2$/g or less, tends to improve dispersibility of silica in the rubber and give sufficient wear resistance of the rubber after vulcanization in the rubber composition for a tire of the present invention.

<Silane Coupling Agent>

In the case of containing silica, the rubber composition for a tire of the present invention preferably contains a silane coupling agent together therewith.

Here, any silane coupling agent conventionally used together with silica in the rubber industry can be used; examples thereof include sulfides such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-triethoxysilylpropylmethacrylatemonosulfide and 3-trimethoxysilylpropylmethacrylatemonosulfide, mercaptos such as 3-mercaptopropyltrimethoxysilane, 3-mercaptopropyltriethoxysilane, 2-mercaptoethyltrimethoxysilane and 2-mercaptoethyltriethoxysilane, vinyls such as vinyltriethoxysilane and vinyltrimethoxysilane, aminos such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane, glycidoxys such as γ-glycidoxypropyltriethoxysilane, γ-glycidoxypropyltrimethoxysilane, γ-glycidoxypropylmethyldiethoxysilane and γ-glycidoxypropylmethyldimethoxysilane, nitros such as 3-nitropropyltrimethoxysilane and 3-nitropropyltriethoxysilane, and chloros such as 3-chloropropyltrimethoxysilane, 3-chloropropyltriethoxysilane, 2-chloroethyltrimethoxysilane and 2-chloroethyltriethoxysilane. These silane coupling agents may be used singly or in combination of two kinds or more.

In the case where the rubber composition for a tire of the present invention contains a silane coupling agent together with silica, the content of the silane coupling agent is preferably 3 parts by mass or more, more preferably 5 parts by mass or more, with respect to 100 parts by mass of silica. The case where the content of the silane coupling agent is 3 parts by mass or more, particularly 5 parts by mass or more, with respect to 100 parts by mass of silica tends to give sufficiently high strength of the rubber after vulcanization in the rubber composition for a tire of the present invention for the reason that chemical bond between the rubber and silica can be sufficiently formed.

In the case where the rubber composition for a tire of the present invention contains a silane coupling agent together with silica, the content of the silane coupling agent is preferably 15 parts by mass or less, more preferably 12 parts by mass or less, with respect to 100 parts by mass of silica. The case where the content of the silane coupling agent is more than 12 parts by mass, particularly more than 15 parts by mass, with respect to 100 parts by mass of silica tends to cause no increase in chemical bond between silica and the rubber even if the silane coupling agent is blended more, but cause an increase in tan δ to the contrary.

<Carbon Black>

The rubber composition for a tire of the present invention may contain conventionally known carbon black derived from petroleum resources; however, the content of carbon black is preferably 5 parts by mass or less with respect to 100 parts by mass of rubber components and most preferably no carbon black is contained at all from the viewpoint of decreasing the use amount of materials derived from petroleum resources.

Conventionally known carbon black such as SAF, ISAF, HAF or FEF can be used as carbon black.

<Age Resistor>

In the case where the rubber composition for a tire of the present invention contains an age resistor, conventionally known age resistors can be used, such as amines, phenols, imidazoles and carbamic acid metal salts.

<Stearic Acid>

In the case where the rubber composition for a tire of the present invention contains stearic acid, conventionally known stearic acid can be used, such as "CAMELLIA" manufactured by Nippon Oil & Fats Co., Ltd.

<Zinc Oxide>

In the case where the rubber composition for a tire of the present invention contains zinc oxide, conventionally known zinc oxide can be used, such as "ZINC FLOWER No. 2" manufactured by Mitsui Mining and Smelting Co., Ltd.

<Oil>

In the case where the rubber composition for a tire of the present invention contains oil, conventionally known oil can be used, such as process oil, vegetable fats and oils, or a mixture thereof. Examples of process oil to be used include paraffinic process oil, naphthenic process oil and aromatic process oil. Examples of vegetable fats and oils to be used include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, safflower oil and tung oil <Vulcanization Accelerator>

In the case where the rubber composition for a tire of the present invention contains a vulcanization accelerator, conventionally known vulcanization accelerators can be used, such as one containing at least one among sulfenamide-based, thiazole-based, thiuram-based, thiourea-based, guanidine-based, dithiocarbarnic acid-based, aldehyde-amine-based or aldehyde-ammonia-based, imidazoline-based, or xanthate-based vulcanization accelerators. Examples of sulfenamide-based vulcanization accelerators to be used include sulfenamide-based compounds such as CBS (N-cyclohexyl-2-benzothiazylsulfenamide), TBBS (N-tert-butyl-2-benzothiazylsulfenamide), N,N-dicyclohexyl-2-benzothiazylsulfenamide, N-oxydiethylene-2-benzothiazylsulfenaride and N,N-diisopropyl-2-benzothiazolesulfenarnide. Examples of thiazole-based vulcanization accelerators to be used include thiazole-based compounds such as MBT (2-mercaptobenzothiazole), MBTS (dibenzothiazyl disulfide), sodium salts, zinc salts, copper salts and cyclohexylamine salts of 2-mercaptobenzothiazole, 2-(2,4-dinitrophenyl)mercaptobenzothiazole and 2-(2,6-diethyl-4-morpholinothio)benzothiazole. Examples of thiuram-based vulcanization accelerators to be used include thiuram-based compounds such as TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide and pentamethylenethiuram tetrasulfide. Examples of thiourea-based vulcanization accelerators to be used include thiourea-based compounds such as thiacarbamide, diethylthiourea, dibutylthiourea, trimethylthiourea and di-ortho-tolylthiourea. Examples of guanidine-based vulcanization accelerators to be used include guanidine-based compounds such as diphenylguanidine, di-ortho-tolylguanidine, triphenylguanidine, ortho-tolylbiguanide and diphenylguanidine phthalate. Examples of dithiocarbamic acid-based vulcanization accelerators to be used include dithiocarbamic acid-based compounds such as zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, a complex salt of zinc pentamethylenedithiocarbamate and piperidine, zinc hexadecyl(or octadecyl)isopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate and cadmium diamyldithiocarbamate. Examples of aldehyde-amine-based or aldehyde-ammonia-based vulcanization accelerators to be used include aldehyde-amine-based or aldehyde-ammonia-based compounds such as an acetaldehyde-aniline reactant, a butyraldehyde-aniline condensate, hexamethylene tetramine and an acetaldehyde-ammonia reactant. Examples of imidazoline-based vulcanization accelerators to be used include imidazoline-based compounds such as 2-mercaptoimidazoline. Examples of xanthate-based vulcanization accelerators to be used include xanthate-based compounds such as zinc dibutylxanthate. These vulcanization accelerators may be used singly or in combination of two kinds or more.

<Tire>

The foregoing rubber composition for a tire of the present invention is processed into a predetermined shape by extruding in an unvulcanized state, and formed into a tire component such as a tread. Then, a green tire is produced by disposing these tire components in predetermined positions, and thereafter the tire of the present invention is manufactured by vulcanizing the rubber composition composing each of the components of the green tire.

FIG. 1 shows a schematic cross-sectional view of the upper left half of one example of the tire of the present invention. Here, a tire 1 is provided with a tread 2 as a ground plane of tire 1, a pair of sidewalls 3 extending from both ends of tread 2 inward in the tire radial direction to compose a side face of tire 1, and bead cores 5 located at the inward end of each sidewall 3. Also, a ply 6 spans bead cores 5,5 and a belt 7 having a hoop effect to reinforce tread 2 is placed outside this ply 6 and inside tread 2.

For example, ply 6 can be formed of a rubber sheet in which a plurality of cords at an angle of 70 to 90° with a tire equator CO (an imaginary line obtained by turning around the center of the width on the outer peripheral surface of tire 1 in the circumferential direction on the outer peripheral surface of tire 1) are buried in the rubber composition. Ply 6 is anchored by folding back from inside to outside in the tire axial direction around bead core 5 from tread 2 through sidewall 3.

For example, belt 7 can be formed of a rubber sheet in which a plurality of cords at an angle of 40° or less with the tire equator CO are buried in the rubber composition.

Also, tire 1 may be provided as required with a band (not shown) for restraining belt 7 from peeling off. Here, for example, the band is composed of a rubber sheet in which a plurality of cords are buried in the rubber composition, and can be placed by spirally winding outside belt 7 approximately in parallel with the tire equator CO.

Also, a bead apex 8 extending from bead core 5 outward in the tire radial direction is formed in tire 1 and an inner liner 9 is placed inside ply 6, and the outside of a folding-back portion of ply 6 is covered with sidewall 3 and a clinch 4 extending from sidewall 3 inward in the tire radial direction.

Tire 1 shown in FIG. 1 is a tire for passenger cars. The present invention is not limited thereto and applied to various kinds of tires such as tires for passenger cars, trucks, buses and heavy vehicles, for example.

In the present invention, it is sufficient that at least a part of tire 1 is formed of the rubber composition for a tire of the present invention, and a tire region such as tread 2 can be formed of the rubber composition for a tire of the present invention.

For example, in the case of forming a tread of a tire by using the rubber composition for a tire of the present invention, use of an epoxidized natural rubber for the rubber composition for a tire of the present invention gives a tire having sufficient grip performance. In addition, reversion can be restrained in producing a tire, and a tire having a tread excellent in strength and thermal aging resistance can be obtained.

EXAMPLES

<Production of Unvulcanized Rubber Sheet>

Each component shown in Tables 1 and 2 was kneaded at 60° C. for approximately 5 minutes by using a roller in accordance with the formulation shown in Tables 1 and 2 to obtain a kneaded product. Then, the obtained kneaded product was molded into a sheet shape to thereby produce each unvulcanized rubber sheet of Examples 1 to 3 and Comparative Examples 1 to 6.

Numerical values shown in the columns of components in Tables 1 and 2 are the blending amounts of each component expressed in part by mass when the blending amount of the epoxidized natural rubber is 100 parts by mass.

TABLE 1

|  |  | Example 1 | Example 2 | Example 3 |
|---|---|---|---|---|
| Components | Epoxidized natural rubber[Note 1] | 100 | 100 | 100 |
|  | Zinc oxide[Note 2] | 3 | 3 | 3 |
|  | Stearic acid[Note 3] | 2 | 2 | 2 |
|  | Sulfur[Note 4] | 2 | 2 | 2 |
|  | Vulcanization accelerator[Note 5] | 1.5 | 1.5 | 1.5 |
|  | Sodium stearate[Note 6] | 0 | 0 | 0 |
|  | Magnesium stearate[Note 7] | 0 | 0 | 0 |
|  | Calcium stearate[Note 8] | 0 | 0 | 0 |
|  | Iron (II) stearate[Note 9] | 0 | 0 | 0 |
|  | Cobalt (II) stearate[Note 10] | 0 | 0 | 0 |

TABLE 1-continued

|  |  | Example 1 | Example 2 | Example 3 |
|---|---|---|---|---|
|  | Zinc stearate (Note 11) | 2 | 0 | 0 |
|  | Aluminum stearate (Note 12) | 0 | 2 | 0 |
|  | Tin (II) stearate (Note 13) | 0 | 0 | 2 |
| Evaluations | Torque maintenance factor | 70.3 | 58.0 | 69.5 |
|  | Tensile strength |  |  |  |
|  | Breaking strength (MPa) | 22.6 | 18.3 | 21.9 |
|  | Breaking extension (%) | 730 | 720 | 700 |
|  | Tensile strength after thermal aging |  |  |  |
|  | Breaking strength (MPa) | 5.9 | 4.5 | 8.9 |
|  | Breaking extension (%) | 550 | 500 | 580 |
|  | tan δ | 0.0433 | 0.0526 | 0.0394 |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Components | Epoxidized natural rubber (Note 1) | 100 | 100 | 100 | 100 | 100 | 100 |
|  | Zinc oxide (Note 2) | 3 | 3 | 3 | 3 | 3 | 3 |
|  | Stearic acid (Note 3) | 2 | 2 | 2 | 2 | 2 | 2 |
|  | Sulfur (Note 4) | 2 | 2 | 2 | 2 | 2 | 2 |
|  | Vulcanization accelerator (Note 5) | 1.5 | 1.5 | 1.5 | 1.5 | 1.5 | 1.5 |
|  | Sodium stearate (Note 6) | 0 | 2 | 0 | 0 | 0 | 0 |
|  | Magnesium stearate (Note 7) | 0 | 0 | 2 | 0 | 0 | 0 |
|  | Calcium stearate (Note 8) | 0 | 0 | 0 | 2 | 0 | 0 |
|  | Iron (II) stearate (Note 9) | 0 | 0 | 0 | 0 | 2 | 0 |
|  | Cobalt (II) stearate (Note 10) | 0 | 0 | 0 | 0 | 0 | 2 |
|  | Zinc stearate (Note 11) | 0 | 0 | 0 | 0 | 0 | 0 |
|  | Aluminum stearate (Note 12) | 0 | 0 | 0 | 0 | 0 | 0 |
|  | Tin (II) stearate (Note 13) | 0 | 0 | 0 | 0 | 0 | 0 |
| Evaluations | Torque maintenance factor | 37.2 | 36.8 | 39.6 | 64.2 | 47.9 | 68.5 |
|  | Tensile strength |  |  |  |  |  |  |
|  | Breaking strength (MPa) | 9.1 | 6.8 | 9.1 | 12.4 | 18.6 | 19.2 |
|  | Breaking extension (%) | 738 | 965 | 795 | 775 | 740 | 700 |
|  | Tensile strength after thermal aging |  |  |  |  |  |  |
|  | Breaking strength (MPa) | 1.6 | 1.3 | 1.7 | 5.2 | 1.4 | 2.0 |
|  | Breaking extension (%) | 373 | 515 | 480 | 623 | 243 | 75 |
|  | tan δ | 0.0806 | 0.1131 | 0.0785 | 0.0470 | 0.0498 | 0.0505 |

(Note 1) Epoxidized natural rubber: manufactured by MRB (Epoxidation rate: 25%)
(Note 2) Zinc oxide: "ZINC FLOWER No. 2" manufactured by Mitsui Mining and Smelting Co., Ltd.
(Note 3) Stearic acid: "CAMELLIA" manufactured by Nippon Oil & Fats Co., Ltd.
(Note 4) Sulfur: powdery sulfur manufactured by Tsurumi Chemical Co., Ltd.
(Note 5) Vulcanization accelerator: "NOCCELER CZ" manufactured by Ouchi Shinko Chemical Industrial Co., Ltd.
(Note 6) Sodium stearate: guaranteed reagents manufactured by Wako Pure Chemical Industries, Ltd.
(Note 7) Magnesium stearate: guaranteed reagents manufactured by Wako Pure Chemical Industries, Ltd.
(Note 8) Calcium stearate: guaranteed reagents manufactured by Wako Pure Chemical Industries, Ltd.
(Note 9) Iron (II) stearate: guaranteed reagents manufactured by Wako Pure Chemical Industries, Ltd.
(Note 10) Cobalt (II) stearate: guaranteed reagents manufactured by Wako Pure Chemical Industries, Ltd.
(Note 11) Zinc stearate: guaranteed reagents manufactured by Wako Pure Chemical Industries, Ltd.
(Note 12) Aluminum stearate: guaranteed reagents manufactured by Wako Pure Chemical Industries, Ltd.
(Note 13) Tin (II) stearate: guaranteed reagents manufactured by Wako Pure Chemical Industries, Ltd.

<Reversion Rate>

A vulcanization curve of each unvulcanized rubber sheet of Examples 1 to 3 and Comparative Examples 1 to 6 was measured at 170° C. by using a curelastometer. Then, when the difference between the maximum torque value and the minimum torque value was regarded as 100, a value of the difference between a torque value 30 minutes after the maximum torque value and the minimum torque value was calculated as a relative value (torque maintenance factor) to use the calculated torque maintenance factor as an index of reversion rate. The results are shown in the columns of torque maintenance factor in Tables 1 and 2.

Higher numerical value in the columns of torque maintenance factor in Tables 1 and 2 denotes lower reversion rate and more favorable state because reversion can be restrained.

<Production of Vulcanized Rubber Sheet>

Each unvulcanized rubber sheet of Examples 1 to 3 and Comparative Examples 1 to 6 was vulcanized at 170° C. for 10 minutes to thereby produce each vulcanized rubber sheet of Examples 1 to 3 and Comparative Examples 1 to 6.

<Tensile Test>

In conformance with JIS K 6251 "Rubber, vulcanized or thermoplastic—Determination of tensile stress-strain properties", a type 3 dumbbell specimen was produced from each vulcanized rubber sheet of Examples 1 to 3 and Comparative Examples 1 to 6 to measure breaking strength (MPa) and breaking extension (%). The results are shown in the columns of tensile strength in Tables 1 and 2.

Higher numerical value of breaking strength (MPa) and breaking extension (%) in the columns of tensile strength in Tables 1 and 2 denotes higher rubber strength of the vulcanized rubber sheet.

<Thermal Aging Test>

A type 3 dumbbell specimen was produced from each vulcanized rubber sheet of Examples 1 to 3 and Comparative Examples 1 to 6 after thermal aging by leaving each unvulcanized rubber sheet in an atmosphere of 100° C. for 72 hours to measure breaking strength (MPa) and breaking extension (%) in conformance with JIS K 6251 "Rubber, vulcanized or thermoplastic—Determination of tensile stress-strain properties". The results are shown in the columns of tensile strength after thermal aging in Tables 1 and 2.

Higher numerical value of breaking strength (MPa) and breaking extension (%) in the columns of tensile strength after thermal aging in Tables 1 and 2 denotes higher rubber strength of the vulcanized rubber sheet after the thermal aging test.

<Rolling Resistance Test>

Dynamic viscoelasticity (tan δ) was measured by using a viscoelastic spectrometer manufactured by Ueshima Seisakusho Co., Ltd. on the conditions of an initial extension of 10%, a dynamic amplitude of ±2%, a frequency of 10 Hz and a temperature of 70° C. The results are shown in the columns of tan δ in Tables 1 and 2. Lower numerical value in the columns of tan δ in Tables 1 and 2 denotes lower rolling resistance.

<Evaluations>

As shown in Tables 1 and 2, it was confirmed that the torque maintenance factor was so high that reversion could sufficiently be restrained in Examples 1 to 3 and Comparative Examples 4 and 6 in which calcium stearate, cobalt (II) stearate, zinc stearate, aluminum stearate or tin (II) stearate was blended.

Also, as shown in Tables 1 and 2, it was confirmed that both breaking strength (MPa) and breaking extension (%) of the vulcanized rubber sheet before the thermal aging test were increased in Examples 1 to 3 and Comparative Examples 5 and 6 in which iron (II) stearate, cobalt (II) stearate, zinc stearate, aluminum stearate or tin (II) stearate was blended.

Also, as shown in Tables 1 and 2, it was confirmed that both breaking strength (MPa) and breaking extension (%) of the vulcanized rubber sheet after the thermal aging test were increased in Examples 1 to 3 and Comparative Example 4 in which calcium stearate, zinc stearate, aluminum stearate or tin (II) stearate was blended.

Also, as shown in Tables 1 and 2, it was confirmed that tan δ was low and rolling resistance was low in Examples 1 to 3 and Comparative Examples 4 to 6 in which calcium stearate, iron (II) stearate, cobalt (II) stearate, zinc stearate, aluminum stearate or tin (II) stearate was blended.

In consideration of the above results, it was found that the rubber composition of Examples 1 to 3 in which zinc stearate, aluminum stearate or tin (II) stearate was blended was generally excellent as compared with the rubber composition of Comparative Examples 1 to 6 from the viewpoint of the torque maintenance factor, breaking strength (MPa) and breaking extension (%) before and after the thermal aging test, and tan δ.

The rubber composition of Examples 1 to 3 having the above characteristic properties together is suitably used for manufacturing a tire, and particularly it is conceived that the formation of a tread of a tire by using the rubber composition of Examples 1 to 3 decreases the use amount of materials derived from petroleum resources and gives a tire having high strength and thermal aging resistance of the tread and sufficient grip performance.

The present invention can provide a rubber composition for a tire whereby reversion can be restrained and high in rubber strength after vulcanization and thermal aging resistance, and a tire manufactured by using the rubber composition for a tire.

Although the present invention has been described in detail, it is clearly understood that the same is by way of illustration only and is not to be taken as limitation, and the scope of the present invention is interpreted by the terms of the appended claims.

What is claimed is:

1. A rubber composition for a tire comprising:
   a rubber component consisting of an epoxidized natural rubber wherein the epoxidized natural rubber is the only rubber component of the rubber composition;
   sulfur; wherein the content of the sulfur is 0.3 to 8 parts by mass with respect to 100 parts by mass of the rubber component; and
   a fatty acid metal salt; wherein said fatty acid metal salt is tin stearate and wherein the content of the fatty acid metal salt is 1 to 10 parts by mass with respect to 100 parts by mass of the rubber component.

2. A tire manufactured by using the rubber composition for a tire according to claim 1.

3. The rubber composition for a tire according to claim 1, wherein the content of the sulfur is 2 to 8 parts by mass with respect to 100 parts by mass of the rubber component; and the content of the fatty acid metal salt is 2 to 10 parts by mass with respect to 100 parts by mass of the rubber component.

4. The rubber composition for a tire according to claim 1, wherein the content of the sulfur is 2 parts by mass with respect to 100 parts by mass of the rubber component; and the content of the fatty acid metal salt is 2 parts by mass with respect to 100 parts by mass of the rubber component.

* * * * *